United States Patent [19]
Cornog

[11] 3,825,041
[45] July 23, 1974

[54] PIPE COUPLING
[76] Inventor: Robert Cornog, 4262 Wilshire Blvd., Suite 320, Redondo Beach, Calif. 90010
[22] Filed: May 22, 1972
[21] Appl. No.: 255,210

[52] U.S. Cl................. 141/1, 141/65, 141/383, 277/58, 277/71, 277/135, 285/351, 285/365
[51] Int. Cl....... B65b 3/04, B65d 53/06, F16l 19/02
[58] Field of Search............ 73/40.7; 141/1, 4, 7, 8, 141/11, 46, 65, 287, 382–386; 277/1, 58, 71, 135; 285/13, 351, 365, 423; 417/154

[56] References Cited
UNITED STATES PATENTS

| | | | |
|---|---|---|---|
| 3,144,035 | 8/1964 | Hablanian et al. | 285/13 X |
| 3,182,896 | 5/1965 | Bachler | 417/154 |
| 3,248,118 | 4/1966 | Pechy | 277/1 |
| 3,499,667 | 3/1970 | Pfeuffer | 285/365 X |
| 3,616,680 | 10/1971 | Schrader | 73/40.7 |

FOREIGN PATENTS OR APPLICATIONS

| | | | |
|---|---|---|---|
| 916,839 | 12/1946 | France | 285/351 |

*Primary Examiner*—Houston S. Bell, Jr.
*Assistant Examiner*—Frederick R. Schmidt
*Attorney, Agent, or Firm*—Smyth, Roston & Pavitt

[57] ABSTRACT

In a coupling for connecting first and second tubes a first sealing member is attached to the first tube, a second sealing member is attached to the second tube, and a first elastomeric means is axially compressed between the first and second sealing members. A third sealing member can be associated with the first sealing member to extend inwardly of and provide a seat for the first elastomeric means.

A recess is defined by portions of the second and third sealing members to inhibit the passage of fluids between the second and third sealing members into contact with the first means. Second elastomeric means may be radially compressed within this recess.

A cavity may be formed between the first elastomeric means and a particular one of the first and third sealing members. The invention includes means for detecting virtual leaks which may occur between the cavity and the interior regions of the tubes.

35 Claims, 14 Drawing Figures

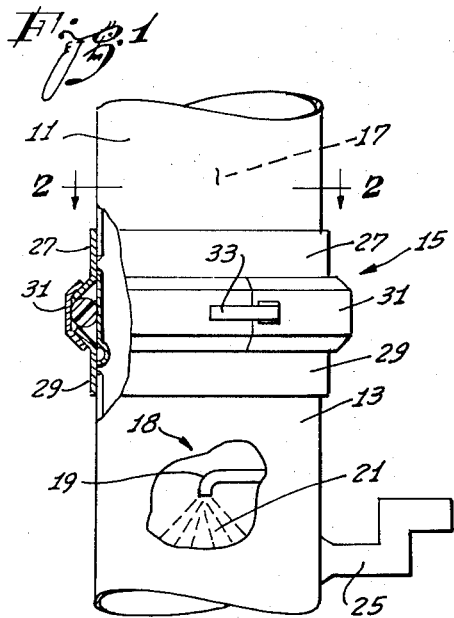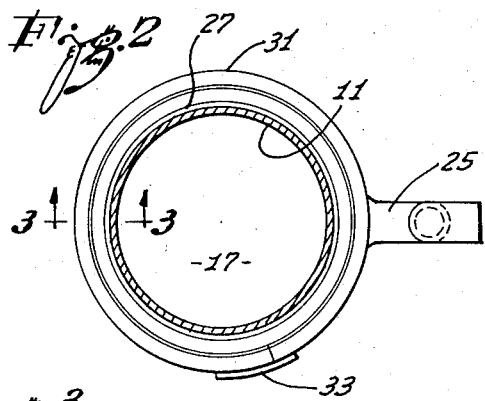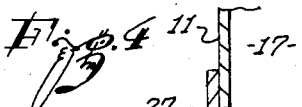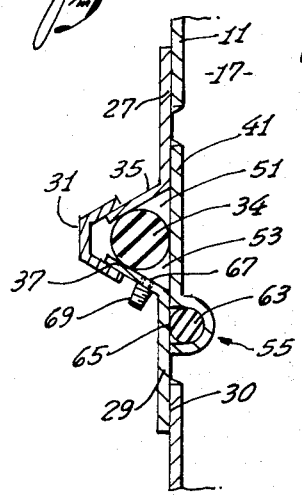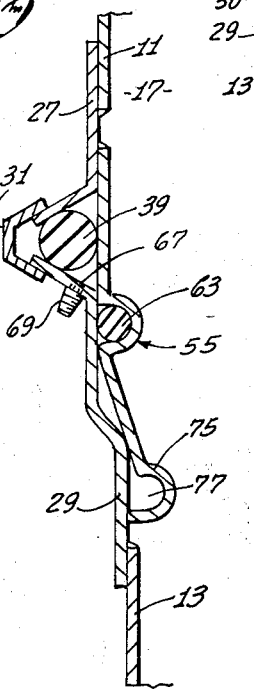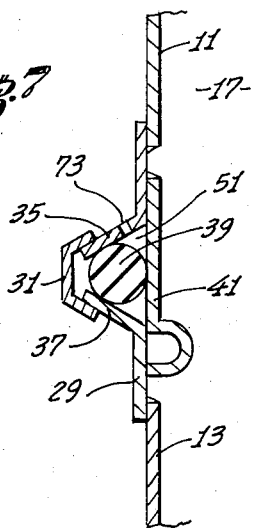

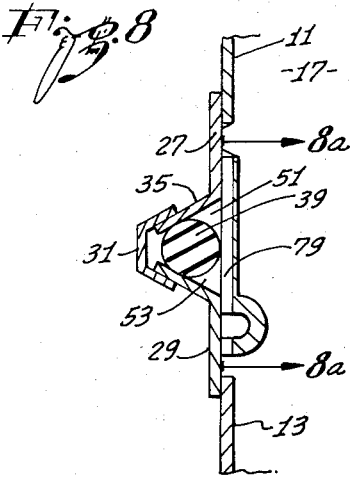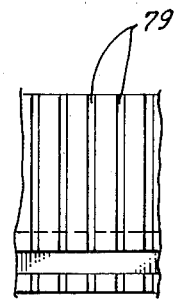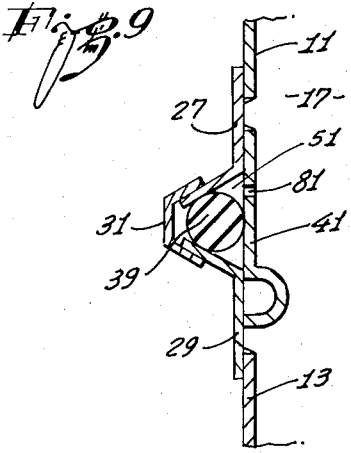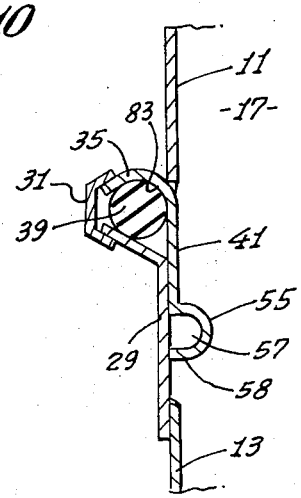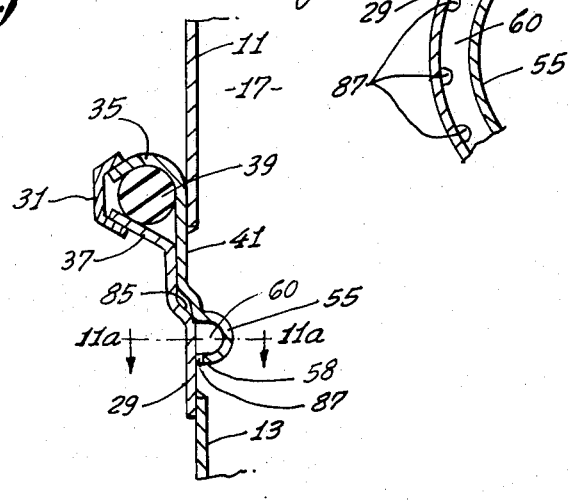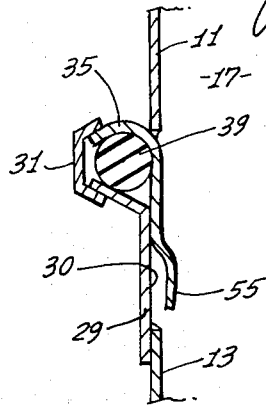

PIPE COUPLING

BACKGROUND OF THE INVENTION

1. Field of the Invention

This invention relates generally to couplings forming a seal between a pair of tubes and more specifically to means for inhibiting the generation of pressure pulses at the seal and means for detecting virtual leaks around the seal.

2. Description of the Prior Art

Tubes having relatively large diameters have been coupled together to provide means for transporting fluids and also to create relatively large vacuum chambers. In the latter case, it has been desirable to couple the tubes to a pump in order to evacuate gas from the chamber and thereby form a vacuum within the tubes. The resulting vacuum chambers have found particular application in simulating the characteristics of outer space and for use in conjunction with instruments such as mass spectrographs.

Oil diffusion pumps are typically used to evacuate the chamber formed by the tubes. In such a pump, oil is ejected interiorly of the chamber in a directed jet to provide a motive fluid for entrapping and removing the gas being pumped. With the use of oil diffusion pumps, vacuums having pressures as low as $10^{-10}$ torr have been achieved.

In many vacuum applications it is desirable to maintain a relatively constant base pressure; deviations from the base pressure are undesirable. For example, a vacuum chamber can be used in conjunction with a mass spectrometer. The mass spectrometer separates a chopped stream of charged particles into a spectrum of homogenous pulses according to the relative mass (i.e., axial velocity) of the particles. By detecting these different pressure pulses at a particular point along the stream, the relative abundance of a given element can be detected and measured. In such an application, the base pressure of the system would be subtracted from the detected pressure to determine the additional pressure added to the system by the presence of the given element. It can be appreciated that in such an application the maintenance of the base pressure at a substantially constant value is of particular importance. In other words, large pulses in the base pressure may seriously degrade the sensitivity and accuracy of the instrument.

Means for coupling first and second tubes have included a first sealing member attached to the first tube to extend beyond the end thereof. A second sealing member has been attached to the second tube so that the end of the second tube extends beyond the second sealing member to engage the first sealing member in proximity to the end of the first tube. The first and second sealing members have included flanges extending toward each other exteriorly on the second tube. An O-ring has been disposed to seat on the second tube between the flanges, and a retaining band has been disposed to engage the flanges and to compress axially the O-ring. In this manner, a seal has been formed between the first and second sealing members.

These couplings have been particularly ineffective when used in conjunction with an oil diffusion pump. For example, the oil used in such a pump has seeped by capillary action between the end of the second tube and the first sealing member to coat the O-ring. Gas permeating the O-ring from regions exterior of the tubes has formed bubbles in the oil on the interior surface of the O-ring. These bubbles have expanded and ultimately burst thereby releasing their gas to the vacuum chamber. This instantaneous release of gas has created within the chamber a pressure pulse which has raised the pressure of the vacuum above the base pressure. In many cases the size of a bubble has been large enough so that the base pressure has not been reestablished for a significant period of time. It can be appreciated that the detection and calibration of elemental pressures during the period of the pressure pulse have been highly inaccurate.

In the tube couplings of the prior art, gas has been trapped in a first cavity defined by the first sealing member, the O-ring, and the second tube. Similarly, gas has been trapped in a second cavity defined by the second sealing member, the O-ring, and the second tube. The gas trapped in the second cavity has been evacuated over a relatively short period of time by the oil diffusion pump. However, the gas trapped in the first cavity has not been readily evacuable since it is separated from the vacuum chamber by a seal between the O-ring and the second tube. As a consequence, after the vacuum has been establihsed in the chamber, the gas in the second cavity has slowly leaked into the chamber to create an undesirable rise in the pressure of the vacuum.

This type of leak has been relatively incapable of detection with the couplings and detection apparatus of the prior art. For example, the tubes typically have been placed in a helium environment with a helium leak detector disposed interiorly of the vacuum chamber. Under these circumstances, the sensing of helium by the leak detector has signified a leak from the exterior regions of the tubes to the vacuum chamber. This procedure has not detected a virtual leak associated with the first cavity, however, because helium has not been present therein. To compound the problem, there has been no means for distinguishing between leaks from the exterior regions of the tube and virtual leaks from the first cavity.

SUMMARY OF THE INVENTION

The present invention includes a first sealing member attached to and extending beyond the end of a first tube. Similarly, a second sealing member can be attached to a second tube to extend beyond the end thereof. The first and second sealing members can be provided with flanges approaching each other exteriorly of the tubes. A third sealing member can be attached to the first sealing member to extend between the flanges into engagement with the second sealing member. An O-ring can be seated on the third sealing member between the flanges, and a retaining band can engage the flanges to axially compress the O-ring and form a first seal.

Portions of one of the second and third sealing members can define a recess having a radial dimension such that fluid in transit toward the O-ring will be trapped in the recess between the second and third sealing members. This will substantially inhibit the trapped fluid from passing between the flanges to coat the O-ring. The resulting coupling will be of particular advantage where oil diffusion pumps are used to evacuate a chamber since the bubbles associated with the couplings of the prior art will not be formed. In this manner, the base pressure can be maintained at a substantially constant value so that fluctuation of pressure within the vacuum chamber can have significance to the phenomena being studied.

In forming the seal, a first cavity may be defined by the first sealing member, the third sealing member, and the O-ring. Similarly, a second cavity may be formed by the second sealing member, the third sealing member, and the O-ring.

In one embodiment of the invention, holes are drilled through the first sealing member into the first air cavity to provide means for filling the first air cavity with a particular gas such as helium. With this configuration, a helium leak detector can be disposed in the chamber so that the detection of helium thereby can signify a leak from the first air cavity. By providing means for detecting such a leak, these couplings solve a significant problem which has plagued the couplings of the prior art.

In another embodiment of the invention, a second O-ring can be disposed in the recess between the first and third sealing members to provide a second seal between the second and third sealing members. This seal may be radial and may be formed by radially compressing the second O-ring. This will permit the use of an external pump to evacuate the second cavity and draw off air escaping from the first cavity. If the pressure within the vacuum chamber can be reduced during operation of the external pump, it will signify that the leak is associated with the first air cavity. This embodiment of the coupling is particularly advantageous in the field where elaborate helium detection apparatus may not be available.

Instead of detecting the virtual leaks associated with the first air cavity, it may be desirable to reduce the possibility that they will occur. This can be accomplished by providing in the third sealing member a channel extending between the first air cavity and the vacuum chamber. Air which would normally be trapped in the first cavity then can be evacuated through the channel by the oil diffusion pump to substantially eliminate the possibility of a virtual leak in the first cavity.

In a further embodiment of the invention, the first and third sealing members are integral and the surfaces thereof contacting the first O-ring are arcuate in cross section. In this configuration the first O-ring is pressed against the arcuate surface so that the first cavity is not even formed. The arcuate surface also enables the coupling to be more easily cleaned. Furthermore, it extends the average diffusion path through which air on the outside of the first O-ring must pass in order to reach the interior surface of the first O-ring.

These and other features and advantages of the present invention will be apparent with reference to the following detailed description taken in conjunction with the associated drawings.

DESCRIPTION OF THE DRAWINGS

FIG. 1 is a front elevational view partially in section of an apparatus including a tube coupling forming a seal between first and second tubes;

FIG. 2 is a sectional plan view of the apparatus taken on line 2 — 2 of FIG. 1;

FIG. 3 is an enlarged fragmentary sectional view of one embodiment of the tube coupling taken on line 3 — 3 of FIG. 2;

FIG. 4 is an enlarged fragmentary sectional view of another embodiment of the tube coupling;

FIG. 5 is an enlarged fragmentary sectional view of an additional embodiment of the tube coupling;

FIG. 6 is an enlarged fragmentary sectional view of still another embodiment of the tube coupling;

FIG. 7 is an enlarged fragmentary sectional view of a tube coupling comprising the features of the invention;

FIG. 8 is an enlarged fragmentary sectional view of an additional embodiment of the tube coupling;

FIG. 8A is an enlarged fragmentary view of the tube coupling taken on line 8A — 8A of FIG. 8;

FIG. 9 is an enlarged fragmentary sectional view of a further embodiment of the tube coupling;

FIG. 10 is an enlarged fragmentary sectional view of still a further embodiment of the tube coupling;

FIG. 11 is an enlarged fragmentary view of an additional embodiment of the tube coupling;

FIG. 11A is an enlarged fragmentary view of the tube coupling taken on line 11A — 11A of FIG. 11; and FIG. 12 is an enlarged fragmentary sectional view of still a further embodiment of the tube coupling.

DESCRIPTION OF PREFERRED EMBODIMENTS

A first tube having a generally cylindrical configuration is shown in FIG. 1 and designated by the reference numeral 11. A second tube 13 having a generally cylindrical configuration is connected to the first tube 11 by a tube coupling shown generally at 15. The tube coupling 15 can include a first sealing member 27 attached to the first tube 11 and a second sealing member 29 attached to the second tube 13. A retaining band 31 having a latch 33 can be disposed to engage the first and second sealing members 27 and 29, respectively, to form a seal between the first and second tubes 11 and 13, respectively. In this manner a chamber 17 can be defined interiorly of the tubes 11 and 13.

The second tube can include an oil diffusion pump 18 having a nozzle 19 for directing a jet of motive fluid, such as oil vapor 21, into the chamber 17. As the oil vapor 21 is ejected through the nozzle 19, it expands radially outwardly and away from the chamber 17 so that gas therein is drawn in the direction of the jet and confined by the oil vapor 21. The gas thus trapped is typically drawn off through an exhaust port 25. By means of the oil diffusion pump 18, gas can be evacuated from the chamber 17 to provide a vacuum having pressures as low as $10^{-10}$ torr.

An enlarged cross-sectional view of the coupling 15 is shown in FIG. 3 wherein the first sealing member 27 is illustrated to include a first flange 35. The first flange 35 is annular in configuration and is disposed with progressively outward positions approaching the second sealing member 29. The second sealing member 29, which has an innermost surface 30, is provided with a second flange 37 annular in configuration and having progressively outward positions approaching the first sealing member 27. Elastomeric means, such as a rubber O-ring 39, can be disposed between the first and second flanges 35 and 37, respectively. In the preferred embodiment, each of the flanges 35 and 37 comprises a portion of a cone whose sides are disposed with respect to its axis at an angle such as 70°.

A third sealing member 41 having an outermost surface 42 and a generally cylindrical configuration can be attached to the first sealing member 27. Preferably, the outermost surface 42 extends inwardly of the O-ring 39 and between the flanges 35 and 37 to engage the innermost surface 30 of the second sealing member 29. The tubes 11 and 13 and the sealing members 35, 37, and 41 are fabricated typically from stainless steel and the connections therebetween are made, typically by welding, on the innermost side of the coupling 15.

The retaining band 31 can include a pair of flanges 43 each engaging one of the first and second flanges 35 and 37, respectively. As the diameter of the retaining band 31 is decreased by operation of the latch 33, the flanges 43 slide upon the first and second flanges 35 and 37, respectively, to force the first and second sealing members 27 and 29, respectively, in opposite axial directions against the O-ring 39. In this manner, a first pair of seals 45 and 47 will be formed axially between the O-ring 39 and the flanges 35 and 37, respectively.

As the O-ring 39 is axially compressed, it may be forced against the third sealing member 41 to form therewith a second seal 49. Between the seal 45 and the seal 49, a first cavity 51 is typically defined by the flange 35, the O-ring 39, and the third sealing member 41. Similarly, between the seals 47 and 49 a second cavity 53 is typically defined by the flange 37, the O-ring 39, and the third sealing member 41.

One of the problems associated with the tube couplings of the prior art has been the tendency of fluids, such as the oil 21, within the chamber 17 to travel by capillary action between the surfaces 30 and 42 of the second and third sealing members 29 and 41, respectively, to coat the surface of the O-ring 39 with a thin layer of liquid. When the chamber 17 has been evacuated, gas that has previously permeated into the O-ring 39 has diffused out and formed bubbles in the coating of oil. When the bubbles have burst, the gas has been released to the chamber 17 to create at least a momentary rise in the pressure of the vacuum. This rise in pressure is sometimes referred to as a pressure pulse. As noted, these pressure pulses are particularly undesirable in those applications, such as a mass spectrograph, where the deviation from a base pressure has particular significance to the phenomena being studied.

As shown in FIG. 3, one embodiment of the present invention includes portions 55 of the third sealing member 41 which define a recess 57 with the outermost surface 30 of the second sealing member 29. As the oil 21 travels by capillary action between the surfaces 30 and 42, it collects in the recess 57 so that further transit between the surfaces 30 and 42 is inhibited. The portions 55 can have a U-shaped cross section including a first side 56 and second side 58 extending radially outward. The portions 55 can be disposed at any location along the third sealing member 41 but preferably the first and second sides 56 and 58 are in proximity to the surface 30. For example, in a preferred embodiment, the portions 55 are disposed at the free end of the third sealing member 41 with the first side 56 of the portion 55 attached to the remaining portions of the third sealing member 41. In this particular embodiment, the second side 58 of the portions 55 defines a leading edge 60 of the third sealing member 41. It is preferable that the dimension between the second side 58 and the surface 30 be such that oil is inhibited from splashing between the first side 56 and the surface 30. The second side 58 may be longer than the first side 56 of the portions 55 to provide a diametral clearance, such as 0.010 inches, between the surfaces 30 and 42. This diametral clearance will increase the ease with which the third sealing member 41 can be inserted into the second sealing member 29.

With reference to FIG. 4, it is apparent that the trap between the surfaces 30 and 42 can be formed by portions 59 of the second sealing member 29 which define a recess 61. The portions 59 also can have a U-shaped cross section, but the sides of the portions 59 preferably extend radially inward. In this embodiment, the recess 61 cooperates with the surface 42 to define the trap.

In the foregoing manner, the recess 57 in the FIG. 3 embodiment and the recess 61 in the FIG. 4 embodiment provide means for inhibiting the coating of the O-ring 39 by the oil 21. This offers a significant advantage when a vacuum is being formed in the chamber 17. Without the coating of oil 21 on the O-ring 39, the bubbles associated with the prior art couplings do not form and the pressure pulses, which are particularly detrimental in a vacuum, are not created. Thus, a relatively low base pressure can be maintained at a substantially constant value so that fluctuations in the pressure can be uniquely associated with the particular phenomena being studied. It can be appreciated that in either of the embodiments shown in FIGS. 3 or 4, it is desirable that the first tube 11 be disposed above the second tube 13 so that oil collecting in the recess 57 or 61, respectively, does not flow by gravity toward the O-ring 39.

A further embodiment of the invention is illustrated in FIG. 5 wherein a second elastomeric means such as the O-ring 63 is disposed in the portion 55 between the surface 30 and 42. The O-ring 63 creates a third seal 65 with the innermost surface 30 of the second sealing member 29. This seal is radial because the O-ring 63 is compressed radially within the portion 55. This embodiment is particularly advantageous in detecting virtual leaks which occur when air passes from the first cavity 51 through the second cavity 53 and into the chamber 17. Such leaks have been relatively incapable of detection with the leak detection apparatus and the couplings of the prior art. For example, if the vacuum chamber 17 is placed in a helium environment and a helium detector is disposed internally of the chamber 17, gas leaking from the regions exterior of the tubes 11 and 13 into the regions interior of the tubes 11 and 13, can be detected. However, since helium is not present in the first cavity 51, a leak from the first cavity 51 into the chamber 17 would not be detected.

In the present embodiment, portions 67 of the flange 37 define a hole between the second cavity 53 and the regions exterior of the tubes 11 and 13. A pump connection 69 can be welded to the portions 67 of the flange 37, and an external pump (not shown) can be attached to the pump connection 69 to provide means for evacuating air from the second cavity 53. In operation, gas leaking from the first cavity 51 into the second cavity 53, which previously had passed to the chamber 17 to raise the pressure of the vacuum, is evacuated by the external pump. It can be appreciated that if the gas evacuated by the external pump was the only gas leaking into the tubes 11 and 13, the pressure within the chamber 17 would stabilize at a substantially constant value. Thus, the reduction of pressure within the chamber 17 provides a significant indication as to whether the virtual leak was associated with the first cavity 51. Alternatively, the hole 67 can be defined by portions of the first flange 35 to provide access to the first cavity 51 and to enable detection of virtual leaks associated therewith. Furthermore, once the leak has been detected, the external pump can be used to maintain the reduced pressure in the chamber 17 so that the effects of the virtual leak are substantially eliminated.

This method and apparatus of detecting virtual leaks can be of significant advantage where there are several tube couplings within a system. By providing the hole 67 in the second flange 37, each of the tube couplings in the system can be individually checked to localize the virtual leak. It can be appreciated by those skilled in the art that the foregoing apparatus and method can be used to pump a common cavity defined in part by a pair of elastomeric means, such as the O-rings 39 and 63, to detect virtual leaks which may be associated with cavities, such as the first cavity 51, on the sides of the elastomeric means opposite the common cavity. This embodiment for detecting virtual leaks is particularly advantageous in the field wherein elaborate helium detection apparatus may not be available.

Where the advantage associated with the dual seal embodiment illustrated in FIG. 5 and the oil protection embodiment illustrated in FIG. 3 are desired, the third sealing member 41 can include portions 75 defining a second recess 77 in proximity to the innermost surface of the second sealing member 29 or the second tube 13. This embodiment, which is shown in FIG. 6, is also representative of the fact that the second and third sealing member 29 and 41 can have dimensions sufficient to accommodate first and second tubes 11 and 13, respectively, having different diameters.

The tube coupling 15 can be embodied in a manner illustrated in FIG. 7 to provide a second apparatus and method for detecting virtual leaks which may be associated with the first cavity 51. As illustrated in FIG. 7, the first flange 35 can include at least a pair of holes 73 (only one of which is shown) between the first cavity 51 and the regions exterior of the tubes 11 and 13. In the traditional manner, the chamber 17 can be placed in a helium environment or alternatively helium can be pumped through one of the holes 73 to fill the first cavity 51 with helium. Then, with a helium detection apparatus disposed internally of the chamber 17, a virtual leak associated with the first cavity 51 could be detected. This embodiment of the tube coupling 15 would provide perhaps the most sensitive means for individually testing each of the tube couplings in a system. Also with this embodiment, a virtual leak associated with the first cavity 51 could be detected even if the second O-ring 63 was not disposed within the recess 57.

Perhaps the easiest way to solve the problem of virtual leaks is to reduce the possibility that they will occur. One means of doing so would be to configure the first cavity 51 so that gas could not be trapped therein. For example, as shown in FIGS. 8 and 8a the third sealing member 41 can be provided with a multiplicity of slots or channels 79 extending axially on either side of the O-ring 39. Desirably, the slots 79 are relatively narrow so that the O-ring 39 is not pressed into the slots 79 to block the passage between the first and second cavities 51 and 53, respectively. This configuration of the tube coupling 15 inhibits the formation of the seal 49 between the O-ring 39 and the third sealing member 41 so that the evacuation of gas from within the chamber 17 also results in the evacuation of gas from the second cavity 53 and the first cavity 51. As long as the pressure within the first cavity 51 and the chamber 17 is substantially equal, there will be no virtual leaks associated with the first cavity 51.

As shown in FIG. 9, another method for evacuating the cavity 51 would be to drill at least one hole 81 in the third sealing member 41 between the first cavity 51 and the chamber 17. In a manner similar to the previous embodiment, the evacuation of the chamber 17 would also evacuate the first air cavity 51 to prevent the formation of virtual leaks therebetween.

As a further means for preventing the formation of virtual leaks, the first air cavity 51 can be entirely eliminated. Thus, the surfaces of the flange 35 and the third sealing member 41 can comprise a continuous surface 83 arcuate in cross section and having a cross-sectional radius greater than the cross-sectional radius of the O-ring 39. In such an embodiment, the O-ring 39 can be compressed against the arcuate surface 83 in which case a cavity such as the first cavity 51 would not be formed.

For example, with reference to FIG. 10, it will be apparent to those skilled in the art that in any of the foregoing embodiments, the third sealing member 41 can be integral with the flange 35 of the first sealing member 27. In such an embodiment, the third sealing member 41 could have a generally cylindrical configuration wherein one end of the cylinder would be bent back on itself outwardly of the cylinder to form the first flange 35. The surface formed between the first flange 35 and the third sealing member 41 could be the arcuate surface 83. At the end of the cylinder opposite of the flange 35, the recess 57 could be formed to provide a generally U-shaped configuration opening outwardly of the cylinder.

The tube 11 can be attached, typically by welding, to the third sealing member 41 in proximity to the arcuate surface 83. If the tube 11 and the third sealing member 41 are attached by welding, the extreme heat may produce a bump, sometimes referred to as drip-through, on the arcuate surface 83. Such a bump would be particularly undesirable if the surface 83 were used to form a seal. This problem can be solved in one of at least two ways, the first of which would be to place a heat sink such as a copper chill plate (not shown) against the arcuate surface 83 during the welding step of the process. Such a heat sink would maintain the arcuate surface 83 at a relatively cool temperature during the welding so that the drip-through would not occur.

Another solution to the problem would be to attach the tube 11 along the third sealing member 41 at a location spaced from the arcuate surface 83. In such an embodiment, the third sealing member 41 and the second sealing member 29 could be bent inwardly as shown in FIG. 11 to accommodate first and second tubes 11 and 13, respectively, having substantially equal diameters. The bending of the second sealing member 29 can produce a ramp 85 which augments the assembly of the first and second tubes 11 and 13, respectively. Thus the leading edge 60 of the third sealing member 41 can be easily slid upon the ramp 85 to bring the flanges 35 and 37 into contact with the O-ring 39.

As shown in FIGS. 11 and 11a, the second side 58 of the portions 55 can be sawed or otherwise cut to provide a plurality of slots or gaps 87 extending axially between the recess 57 and the chamber 17. Preferably, the gaps 87 are large enough that the oil 21 will not bridge the gaps 87 to form a seal at the free end of the third sealing member 41. This is particularly advantageous in alleviating any possibility that gas in the second cavity 53 would bubble into the chamber 17.

Another embodiment of the tube coupling 15 which provides the foregoing advantages is shown in FIG. 12. In this embodiment, the free end of the portions 55 is spaced from the innermost surface 30 of the second sealing member 29 a distance sufficient to prevent the formation of a seal therebetween. In the preferred embodiment, wherein oil is used as the motive fluid in the pump 18, this diametral clearance between the free end of the portions 55 and the surface 30, may be approximately one-eighth inches.

The tube couplings disclosed herein offer significant advantages in joining tubes to form a seal. Many of these advantages have particular significance when the tubes are used to form a vacuum chamber or if the seals are formed in proximity to a liquid. For example, when an oil diffusion pump is used to create a vacuum in the connected tubes, the recess 61 or 57 formed in the second or third sealing members 29 and 41, respectively, will substantially inhibit the capillary action which heretofore has enabled the oil 21 to coat the O-ring 39. By eliminating the oil coating on the O-ring 39, air or gas bubbles do not form on the interior surface thereof and pressure pulses within the chamber 17 do not hinder the maintenance of a substantially constant base pressure in the vacuum system. By substantially eliminating the pressure pulses, any observed fluctuations in pressure can be associated with the phenomenon being studied.

The tube couplings having double seals, as shown specifically in FIGS. 5 and 6, also offer particular advantages in the detection and elimination of virtual leaks. Wherein couplings of the prior art have trapped air in the first cavity 51 and the trapped air has slowly seeped past the O-ring 39 into the vacuum chamber 17 to produce a relatively undetectable virtual leak, the provision of the O-ring 63 and the pump connection 69 enables such a leak to be detected and eliminated. This detection can take place even in environments where a helium mass spectrometer leak detector is unavailable. For example, even in the field, virtual leaks can be detected and eliminated by the mere provision of a small external vacuum pump.

In those environments where a helium detector is available, the holes 73 (FIG. 7) drilled in the first sealing member 27 will enable the detection of a virtual leak associated with the first cavity 51. Also such a virtual leak can be eliminated by means of a small external vacuum pump attached to the pump connection 69.

As an alternative to detecting a virtual leak associated with the first cavity 51, the cavity 51 can be vented to the vacuum chamber 17 by means of the slot 79 or the hole 81. This will ensure that gas is not trapped within the first cavity 51 so that there can be no virtual leak associated with that cavity.

As a further alternative the first cavity 51 can be eliminated entirely by the tube coupling shown in FIGS. 10 and 11 wherein the surface between the flange 35 and the third sealing member 41 is arcuate in cross section. As shown in FIG. 11, all of these advantages can be appreciated by spinning the third sealing member 41 as a single integral cylinder. This one piece construction will overcome the capillary action of the oil, eliminate virtual leaks associated with the tube coupling, and enhance the ease with which the tubes 11 and 13 can be joined.

Although this application has been disclosed and illustrated with reference to particular embodiments, the principles involved are susceptible of numerous other applications which will be apparent to persons skilled in the art. The invention is therefore to be limited only as indicated by the scope of the appended claims.

I claim:

1. A method of detecting and substantially eliminating a virtual leak between a first cavity and a vacuum chamber providing:

a first and second tube for defining a chamber;

a coupling between the first and second tubes, the coupling including first and second elastomeric members defining in part a common cavity therebetween and one of the first and second elastomeric members defining in part a first cavity on the side thereof opposite the common cavity;

evacuating the chamber to form a partial vacuum therein;

evacuating the common cavity to withdraw any gas seeping from the first cavity into the common cavity;

sensing the stability of the pressure in the chamber; whereby, the maintenance of a substantially constant pressure in the chamber signifies that the virtual leak is associated with the first cavity and the continued evacuating of the common cavity substantially eliminates the virtual leak between the first cavity and the chamber.

2. In combination for coupling first and second tubes, a first sealing member having a fixed relationship with the first tube;

a second sealing member having a fixed relationship with the second tube;

first elastomeric means disposed between the first and second sealing members and being compressed by the first and second sealing members to form a seal with the first and second sealing members;

a third sealing member connected to the first sealing member and extending inwardly of the first means to maintain the first elastomeric means between the first and second sealing members; and second means having a fixed relationship with one of the second and third sealing members and disposed in close proximity to the other of the second and third sealing members for inhibiting capillary action between the second and third sealing members.

3. The combination recited in claim 2 wherein the second means is integral with the third sealing member.

4. The combination as set forth in claim 3 wherein the third sealing member is integral with the first sealing member.

5. The combination set forth in claim 2 wherein the second means includes:

first portions of one of the second and third sealing members defining an annular recess; and second portions of the other of the second and third sealing members extending across the annular recess so that the first and second portions form a trap for collecting liquids passing between the second and third sealing members.

6. A coupling for connecting a first tube and a second tube and forming a seal therebetween, comprising:

a first sealing member having a generally cylindrical configuration and a fixed relationship with the first tube;

a second sealing member having a generally cylindrical configuration and a fixed relationship with the second tube;

first elastomeric means disposed between the first and second sealing members;

second means engaging the first and second sealing members to axially compress the first means and thereby to form a first seal between the first and second sealing members;

a third sealing member connected to the first sealing member and extending inwardly of the first means to provide a seat for the first means;

first portions of the third sealing member defining an annular recess in proximity to the second sealing member; and third means for evacuating portions of the interior regions of the first and second tubes to form a partial vacuum therein.

7. The coupling as set forth in claim 6 wherein the first and third sealing members define a surface arcuate in cross section and contacting the first means wherein the cross-sectional radius of the arcuate surface is greater than the cross-sectional radius of the first means.

8. The coupling as defined in claim 6 wherein:

the first and third sealing members and the first means define a first cavity;

the second and third sealing members and the first means define a second cavity on the side of the first means opposite the first cavity; and fourth elastomeric means is disposed in the annular recess to form a second seal with the second sealing member.

9. The coupling recited in claim 8 further comprising:

fifth means including portions of one of the first and second sealing members for detecting and substantially eliminating virtual leaks which may have occured between the first cavity and the interior regions of the first and second tubes.

10. The coupling set forth in claim 9 wherein the fifth means includes:

portions of the second sealing member defining a hole extending between the exterior regions of the tubes and the second cavity;

a pumpout connection disposed exteriorly of the tubes in contact with protions of the second sealing members;

an external pump attached to the pumpout connection to evacuate the second cavity; whereby, a reduced pressure within the tubes indicates that the virtual leak is associated with the first cavity and minimizes the effects of the virtual leak.

11. The coupling recited in claim 9 wherein the fifth means comprises:

portions of the first sealing member defining at least a pair of holes extending between the first cavity and the regions exterior of the tubes;

a gas extending through at least one of the holes to fill the first cavity;

sixth means disposed interiorly of the tubes and having characteristics for detecting the gas therein; whereby, detection of the gas by the sixth means indicates that the virtual leak is associated with the first cavity.

12. The coupling set forth in claim 8 further comprising:

seventh means including second portions of the third sealing member for inhibiting the formation of virtual leaks between the first cavity and the interior regions of the tube.

13. The coupling set forth in claim 12 wherein in the seventh means the second portions of the third sealing member define at least one slot extending axially between the first cavity and the interior regions of the tube so that the evacuation of the interior regions of the tubes by the third means results in the evacuation of the first cavity.

14. The coupling set forth in claim 12 wherein in the seventh means, the second portions of the third sealing member define at least one hole extending radially between the first cavity and the interior regions of the tube so that the evacuation of the interior regions of the tubes by the third means results in the evacuation of the first cavity.

15. In a coupling for connecting first and second tube and forming a seal therebetween, a first sealing member having a fixed relationship with the first tube;

a second sealing member having a fixed relationship with the second tube;

a third sealing member having a fixed relationship with the first sealing member;

first elastomeric means radially compressed between the second and third sealing members to form a first seal therebetween;

second elastomeric means axially compressed between the first and second sealing members to form a second seal therebetween.

16. The coupling set forth in claim 15 further comprising:

the second means and the third sealing member partially defining a first cavity on one side of the second means and a second cavity on the other side of the second means; and third means associated with one of the first and second cavities to detect virtual leaks associated with the other of the first and second cavities.

17. The coupling set forth in claim 16 wherein the third means comprises:

portions of one of the first and second sealing means defining a hole between the associated one of the first and second cavities and regions exterior of the tube;

a pump connected to the portions for evacuating the associated one of the cavities to detect virtual leaks emanating from the other of the first and second cavities.

18. The coupling set forth in claim 15 wherein:

portions of the third sealing member define an annular recess on the side of the first means opposite the second means, the annular recess defined in proximity to the second sealing member to inhibit the passage of fluids between the second and third sealing members.

19. Apparatus for creating a partial vacuum including:

a first tube having a closed end and an open end;
a second tube having a closed end and an open end;

first means for coupling the open ends of the first and second tubes to form at least one seal therebetween wherein the tubes define a chamber;
elastomeric means included in the first means to form the seals, the elastomeric means having properties for permitting a slight seepage of air from regions exterior of the chamber to regions interior of the chamber;
a diffusion pump for diffusing a motive fluid within the chamber to create and maintain a partial vacuum in the chamber, the motive fluid having a tendency to coat the elastomeric means so that the air seeping through the elastomeric means has a tendency to form gas bubbles which burst to form pressure pulses in the vacuum; and
third means included in the first means for inhibiting the coating of the elastomeric means by the motive fluid so that gas bubbles are not formed.

20. The combination set forth in claim 19 wherein the first means includes:
first portions of the first means defining a passage between the regions interior of the tubes and the elastomeric means wherein the motive fluid has a tendency to move through the passage to coat the elastomeric means;
second portions of the first means included in the third means and defining a recess along the passage for inhibiting the movement of the motive fluid through the passage and thereby inhibiting the formation of the gas bubbles having properties for bursting to produce a pressure pulse.

21. The combination set forth in claim 20 wherein the motive fluid is oil.

22. The combination recited in claim 20 wherein the elastomeric means includes:
a first O-ring having portions exposed to regions exterior of the chamber, and compressed by the first means to form a first seal; and
a second O-ring disposed in the recess defined by the second portions, and compressed by the first means to form a second seal.

23. In a coupling forming a seal between first and second tubes;
a first sealing member having a fixed relationship with the first tube;
a second sealing member having a fixed relationship with the second tube;
first portions of the second sealing member defining a cylinder;
second portions of the second sealing member bent back on the cylinder to form a first flange; and
first elastomeric means engaging the first flange and the first sealing member to form a seal between the first and second tubes.

24. The coupling set forth in claim 23 further comprising:
third portions of the second sealing member defining an annular recess in proximity to the first sealing member.

25. The coupling set forth in claim 24 wherein:
the second portions of the second sealing member define an arcuate surface with the first portions of the second sealing member, and the first elastomermic means engages the arcuate surface.

26. The coupling set forth in claim 25 further comprising:
a second flange included in the first sealing member and extending outwardly of the tubes to engage the first elastomeric means; whereby,
the first elastomeric means is axially compressed between the first and second flanges to form the seal.

27. The coupling set forth in claim 26 wherein the second portions of the second sealing member and the third portions of the second sealing member are disposed at opposite ends of the cylinder defined by the first portion of the second sealing member.

28. The coupling recited in claim 24 wherein the third portions of the second sealing member include:
a first side member disposed with respect to the tubes and connected to the first portions of the second sealing member to define one side of the annular recess; and
a second side member radially disposed with respect to the tubes and connected to the first side member to define another side of the annular recess, the second side member including a plurality of gaps extending between the annular recess and regions interior of the tubes.

29. The coupling recited in claim 24 wherein the third portions of the second sealing member include:
a first side member radially disposed with respect to the tubes and connected to the first portions of the second sealing member; and
a second side member extending generally in an axial direction with respect to the tubes and spaced from the first sealing member to inhibit the formation of a seal with the first sealing member.

30. In combination for coupling first and second tubes,:
a first sealing member having a fixed relationship with the first tube;
a second sealing member having a fixed relationship with the second tube;
first elastomeric means disposed between the first and second sealing members to form a seal therewith;
a third sealing member connected to the first sealing member and extending inwardly of the first means to provide a seat for the first elastomeric means;
second means having a fixed relationship with one of the second and third sealing members and disposed in close proximity to the other of the second and third sealing members for inhibiting capillary action between the second and third sealing members;
first portions of one of the second and third sealing members included in the second member and defining an annular recess; and
second portions of the other of the second and third sealing members included in the second means and extending across the annular recess so that the first and second portions form a trap for collecting liquids passing between the second and third sealing members.

31. Apparatus for coupling first and second cylindrical tubes to form a seal therebetween, comprising:
a first coupling member having a fixed relationship with the first tube and including a first flange having an arcuate surface and extending outwardly of the first tube;

a second coupling member having a fixed relationship with a second tube and including a second flange extending outwardly of the second tube; and a first O-ring engaging the arcuate surface of the first flange and compressed between the first flange and the second flange to form a first seal between the first and second tubes.

32. The apparatus recited in claim 31 wherein the first coupling member includes:
 first portions of the first coupling member connected to the first tube and having the configuration of a cylinder;
 second portions of the first coupling member bent back on the cylinder to define the arcuate surface of the first flange of the first coupling member; wherein
 the first O-ring is confined between the first portions of the first coupling member and the second flange of the second coupling member by the first portions of the first coupling member.

33. The apparatus set forth in claim 32 further comprising;
 third portions of the first coupling member connected to the cylinder at the end thereof opposite the second portions of the first coupling member, the third portions defining an annular recess of inhibiting capillary action between the first coupling member and the second coupling member.

34. The apparatus recited in claim 33 further comprising a second O-ring disposed in the annular recess defined by the third portions of the first coupling member to form a second seal between the first coupling member and one of the second coupling member and the second tube.

35. The combination as defined in claim 31 wherein the first flange has in cross section an arcuate surface contacting the O-ring wherein the cross-sectional radius of the arcuate surface is greater than the cross-sectional radius of the O-ring.

* * * * *